Figure 1:
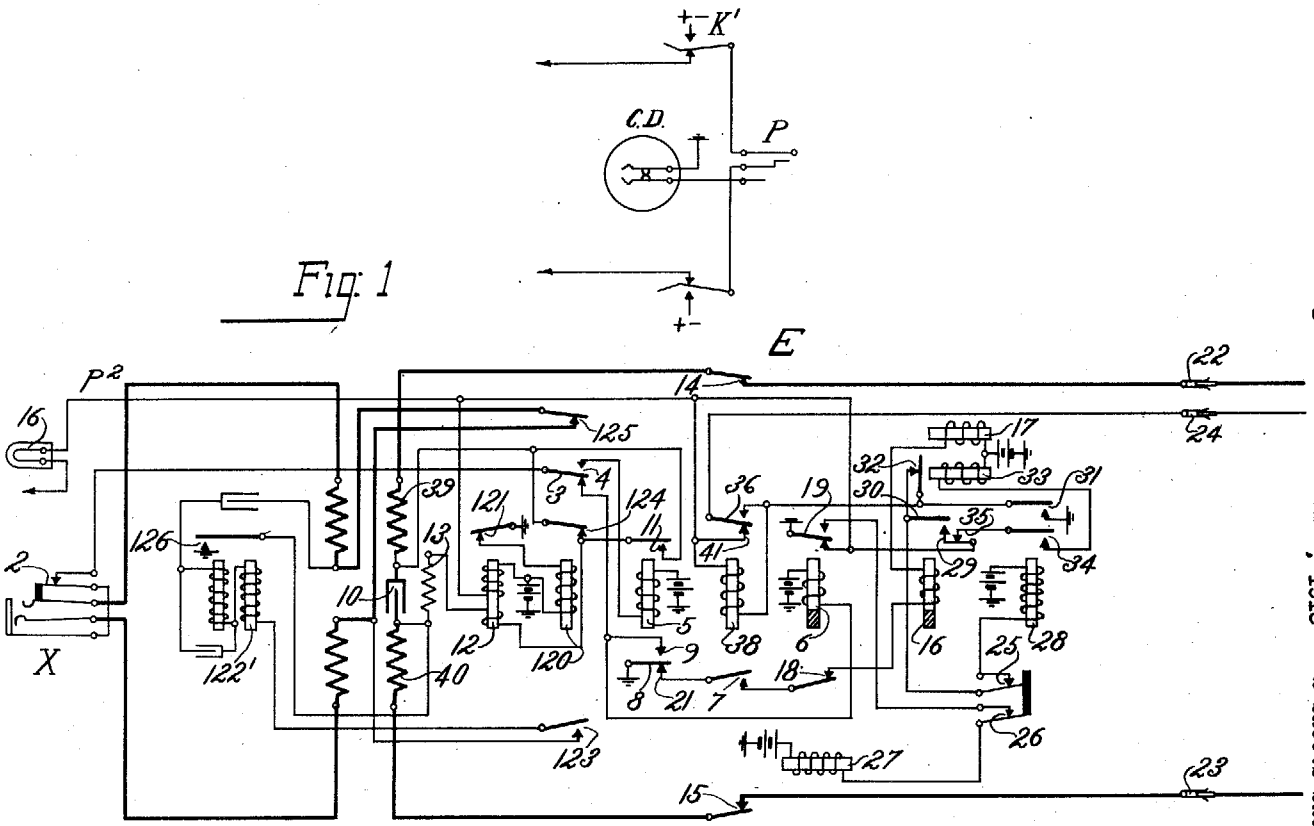

Dec. 6, 1932. J. WICKS Re. 18,687

SEMIAUTOMATIC TELEPHONE SYSTEM

Original Filed March 4, 1918 2 Sheets-Sheet 1

Inventor
John Wicks
Chas. M. Cady
Attorney

Dec. 6, 1932. J. WICKS Re. 18,687
SEMIAUTOMATIC TELEPHONE SYSTEM
Original Filed March 4, 1918 2 Sheets-Sheet 2
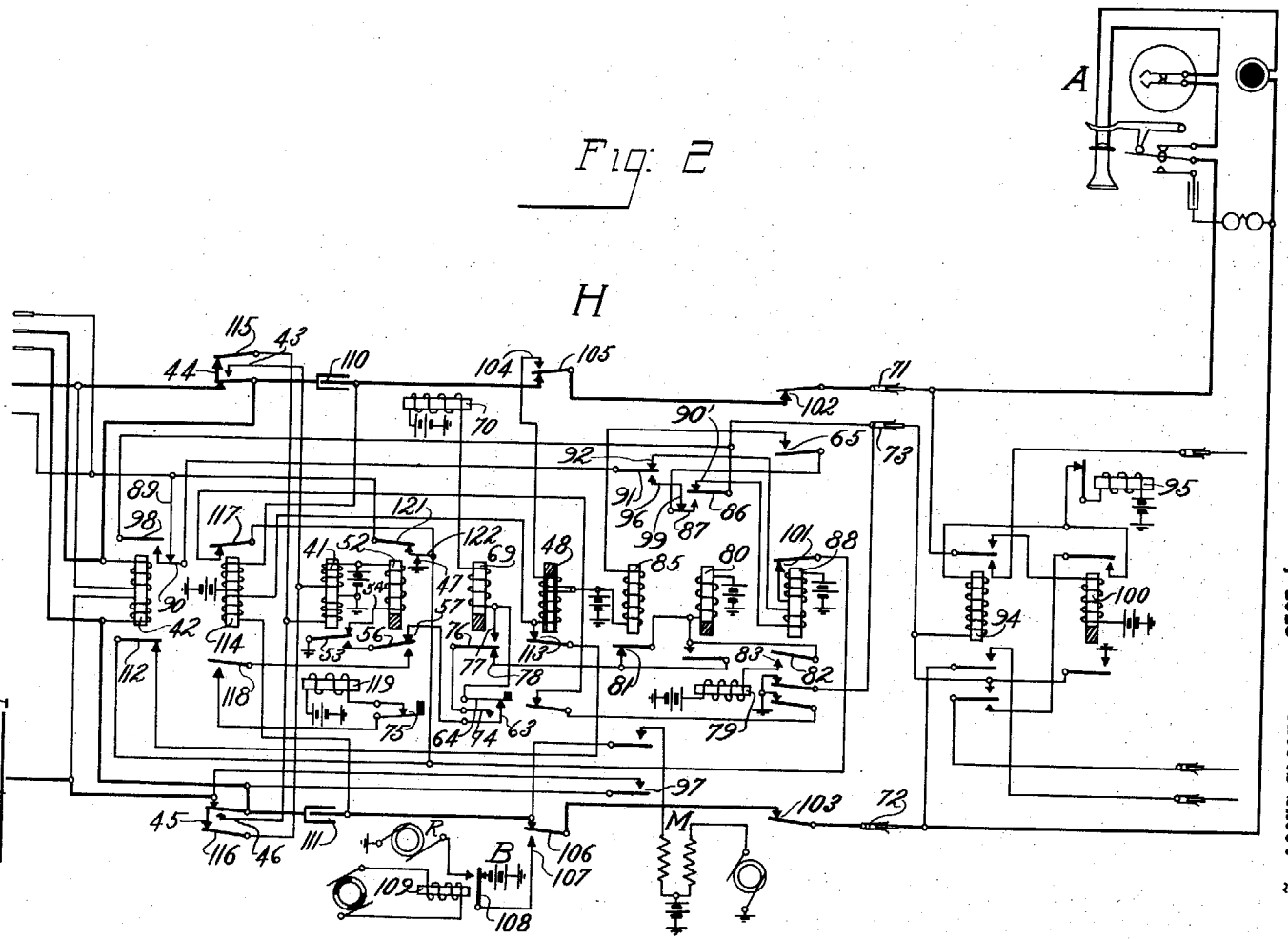
Inventor
John Wicks
Chas. M. Cady Attorney Reissued Dec. 6, 1932

Re. 18,687

UNITED STATES PATENT OFFICE

JOHN WICKS, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

SEMIAUTOMATIC TELEPHONE SYSTEM

Original No. 1,404,416, dated January 24, 1922, Serial No. 220,151, filed March 4, 1918. Application for reissue filed January 23, 1924. Serial No. 688,081.

My invention relates in general to improved circuits and apparatus for use in a semi-automatic telephone system in which automatic switches are controlled either automatically by a subscriber or through the medium of an operator to establish connections.

More specifically, my invention relates to means whereby in such a system, when a call is made from a subscriber, the called substation will be signaled as in the usual practice; but, when a call is extended through the medium of an operator, the called subscriber will first be signaled automatically and then the operator may re-ring the called subscriber by the use of her ringing key.

In a system of this character, it is often desired to enable the operator to re-ring the called subscriber after the automatic ring has been disconnected, either because the called subscribed has hung up his receiver before the conversation was completed or because the operator has another call waiting for the same line.

The object of my invention, therefore, is to provide an improved switching mechanism for connecting with a called line, which mechanism may be used either by a subscriber or an operator and in which means are provided for enabling the operator to re-ring the called subscriber.

In the drawings, I have shown an operator's toll selector E (Fig. 1) having access to a connector switch H (Fig. 2) which in turn has access to subscribers' lines. This connector H is also multipled in the banks of local selectors which are used when a subscriber in the same exchange desires to use the connector H.

The cord circuit C of which only a portion of the local end is shown, may be of any approved long distance type and comprises among other essentials the usual tip and ring talking strands terminating in the plug P, and a ringing key K′. The calling device CD may be of any well known two wire type such for example as the one shown in British patent to Dicker No. 29,654 of 1910.

I have shown the switches in operated position, that is, in the position assumed after the call has been set up from an operator and after the called subscriber has answered, to disconnect the automatic ringing circuit. To ring the called subscriber again after he has hung up his receiver is accomplished by means of the differentially wound relay 42 in the connector H and a specially tuned relay 122′ in the selector E. The relay 42 it will be noted, is short-circuited during the conversation to remove its resistance from the talking circuit and is also left out of the circuit when the connector H is used in a local call.

I will now point out more in detail, referring to the accompanying drawings, the method of operation involved when an operator establishes a connection with the substation A (Fig. 2) automatically rings the same first and may thereafter re-ring the substation A by means of the improved circuits.

The operator first inserts the calling plug P of her cord circuit into the jack X of the selector E thereby closing at the springs 2, a circuit for line relay 5 which may be traced from ground at the calling device sleeve of plug P and jack X, springs two, springs 3 and 4, and relay 5 to battery. The relay 5 will immediately energize over this circuit and close a circuit for the slow relay 6 from ground through springs 8 and 9, and relay 6 to battery. The relay 5 also closes a high resistance shunt about the condenser 10 which is connected between a pair of the windings of the repeating coil, said circuit extending from the upper side of condenser 10, springs 11, lower winding of relay 12, and resistance 13 to the lower side of the condenser. The closure of this shunt circuit, however, has no effect at this time as the talking circuit is still open at the springs 14 and 15. The energization of the slow relay 6 over the previously traced circuit supplied a ground to the supervisory circuit to light the busy lamp 16, and others which may be multipled therewith, through springs 19 and 20; grounds the upper winding of the electropolarized relay 12, which relay, however, is arranged so that it will not operate its armatures unless the current flowing in both windings is in the same direction, and also prepares a circuit from the back contact of relay 5 through the series slow relay 16 and the vertical magnet 17 at the springs 18.

Now when the operator's calling device is operated for the first digit of the called number, the circuit of the line relay 5 is thereby interrupted a corresponding number of times. Each time the relay 5 deenergizes it closes a circuit from ground through springs 8 and 21, relay 16, and vertical magnet 17 to battery. The vertical magnet 17 operates in response to this series of impulses to lift the wipers 22, 23 and 24 opposite some level of the banks to which connector switches, having access to a desired group of lines, are connected. Although the circuits of relays 6 and 16 are interrupted momentarily at each operation of relay 5 both will remain energized during transmission of such impulses and after the impulses cease and relay 5 comes to rest energized, the relay 16 will fall back and relay 6 will remain energized. As soon as the vertical magnet operates the shaft and wipers one step, the off-normal springs 25 and 26 close. The springs 26 close the circuit of release magnet 27 at one point and the springs 25 close a point in the circuit of the rotary interrupter relay 28. The circuit of the release magnet 27 is maintained open at the back contact of relay 6. The relay 28, however, energizes as soon as the springs 25 close over a circuit extending from ground through springs 19 and 20 of relay 6, springs 29 and 30 of relay 16, springs 25, and relay 28 to battery. The relay 28, upon energizing, closes a locking circuit for itself at the springs 31 extending from ground through springs 31, interrupter springs 32 of rotary magnet 33, springs 25, and relay 28 to battery, and also closes one point in the circuit of the rotary magnet 33 at springs 34. Now after the impulses for the first digit cease and the relay 16 deenergizes, a circuit is closed for the rotary magnet extending from ground through springs 19 and 20, springs 29 and 35, springs 34, and magnet 33 to battery. The rotary magnet 33, therefore, operates to step the wipers 22, 23 and 24 one step onto the first set of contacts in the bank level before which it stands. Another result of the operation of the rotary magnet is to open the locking circuit of the relay 28 at springs 32. The relay 28 will therefore deenergize and open the circuit of the rotary magnet at springs 34 and also open a contact in its own locking circuit at springs 31. As soon as the springs 34 open, the rotary magnet will deenergize and again close springs 32. Assuming now that the trunk line selected is busy, then a ground potential will be found on the private contact with which the wiper 24 is now in contact. As soon, therefore, as the springs 32 come into contact a new circuit will be closed for the relay 28 extending from ground over the wiper 24, springs 36 and 37, springs 32, springs 25, and relay 28 to battery. The relay 28 will again operate to close the circuit of magnet 33 and its own circuit to step the wipers to the next contact. This alternate operation of the relay 28 and rotary magnet 33 continues until an idle trunk line is reached, at which time no ground will be found upon the private contact and the relay 28 will therefore remain deenergized after the springs 32 are closed. It may be here noted that, during the energization of the relay 16 and also during the rotation of the wipers, the relay 38, although in series with the relay 28, is maintained short circuited, first by the ground through springs 19, 20, 29 and 30 and during rotation by the ground on the private wiper. The last mentioned short circuit extends from ground on wiper 24, springs 36 and 37, relay 38, springs 20 and 19 to ground. Now, however, when an idle trunk is reached, this short circuit is removed and the relay 38 which is of high resistance energizes in series with relay 28. The circuit for energizing this relay extends from ground through the springs 19 and 20, relay 38, springs 32, springs 25, and relay 28 to battery. The relay 28 does not energize over this circuit on account of the high resistance of the winding of relay 38. The relay 38, upon energizing, extends the talking circuit from the windings 39 and 40 of the repeating coil to the wipers 22 and 23, and also prepares a locking circuit for itself through the springs 36 and 41 which will be supplied with ground from the switch ahead as will be pointed out. Another result of the energization of relay 38 is to open the springs 7, thereby preventing any further operation of the operating magnets.

Now as soon as the relay 38 closes its springs 14 and 15, a circuit is thereby established for the line relay 41 of the connector H through the windings of the differentially wound relay 42. The relay 42 does not energize at this time as its two windings oppose each other. The circuit for relays 41 and 42 extends from battery through the upper winding of relay 41, springs 43 and 44, upper winding of relay 42, wiper 22, springs 14, winding 39 of the repeating coil, springs 11, lower winding of relay 12, resistance 13, which may be approximately 200 ohms, winding 40 of repeating coil, springs 15, wiper 23, lower winding of relay 42, springs 45 and 46, and lower winding of relay 41 to ground. The relay 12 of selector E does not energize at this time as the current in its two windings flows in opposite directions. The line relay 41, upon energizing, closes the circuit of slow relay 52 through the springs 53 and 54, which relay, upon energizing, connects ground to the release trunk through springs 47, 122 and 121, to render the switch busy to other calls and also to supply an additional ground to the holding circuit of relay 38 (Fig. 1).

Now when the operator sends out the second digit of the called number, the line relay 5 of selector E will be operated as is the previous digit to attract and detract its armatures a predetermined number of times. The closure of springs 8 and 21 has no effect at this time due to the springs 7 being held open by relay 38. The opening and closing of springs 11, however, opens and closes the circuit, previously traced, of the line relay 41 of the connector H. The relay 41, each time it detracts its armature, operates to open and close the springs 53 and 62, to thereby open and close a circuit for the vertical magnet. The circuit of the vertical magnet extends from ground through springs 53 and 62, springs 56 and 57, springs 63 and 64, slow relay 69, and vertical magnet 70 to battery. The vertical magnet will be operated a number of times to step the wipers 71, 72 and 73 to a group or level of trunk lines in which the terminals of the desired line are located. Upon the first vertical step of the wipers, the off-normal springs 63 and 64 are opened and spring 63 comes into contact with spring 74, and the springs 75 are closed. Although the circuit for the vertical magnet is opened by the springs 63 and 64, a new circuit has been closed in the meanwhile by the operation of relay 69, which circuit extends from ground through springs 53 and 62, springs 56 and 57, springs 63 and 74, springs 76 and 77, and over the previously traced circuit through the vertical magnet. It may be noted that the slow relay 52 remains energized during the entire operation of the line relay regardless of the momentary deenergization thereof, and that the relay 69 remains energized constantly during the first series of impulses, but deenergizes at the end of the first series when the line relay comes to rest energized. Now, when the relay 41 comes to rest energized after the impulses to the vertical magnet cease, the relay 69 will deenergize, opening its own circuit at the springs 76 and 77, and closing at the springs 76 and 78, a point in the circuit of the rotary magnet 79 and also of the slow relay 80. Now, when the line relay 41 is again operated in response to the third or last digit, through the medium of the line relay 5 of selector E, the rotary magnet 79 is operated to rotate the wipers 71, 72 and 73 to the terminals of the desired line. The circuit of the rotary magnet extends from ground through springs 53 and 62, springs 56 and 57, springs 63 and 74, springs 76 and 78, springs 81, springs 82 and 83, and rotary magnet 79 to battery. A branch of this circuit extends from the springs 81 through the slow relay 80 to battery so that relay 80 and magnet 79 are energized in multiple. The relay 80 energizes upon the first impulse and closes the springs 84, thereby short circuiting the springs 81 of relay 85 and maintaining the circuit of itself and magnet 79 closed irrespective of the condition of relay 85 during this series of impulses. Another result of the energization of the slow relay 80 is to close a point in the circuit of the busy or test relay 85, at the springs 86 and 87. The relay 80 being slow acting, will maintain the springs 86 and 87 closed for a brief interval after the line relay has come to rest and connection has been made with the terminals of the desired line.

Assuming the called line to be busy because of some call being extended therefrom, as shown, then the private contact will be grounded. Before the springs 86 and 87 are opened, therefore, a circuit will be completed for the busy relay 85, extending from ground to the wiper 73, springs 86 and 87, springs 65, and relay 85 to battery. The relay 85 energizes to close a locking circuit for itself which is closed as soon as relay 80 falls back and extends through springs 65, springs 87 and 99, springs 96 and 91, springs 90 and 89, and springs 121, 120 and 47 to ground; opens the circuit of the relay 88 at springs 92 and 91; opens the initial energizing circuit for the rotary magnet and relay 80 at springs 81; closes a shunt or short circuit about the lower winding of relay 42 at springs 97, and connects the secondary winding of the busy machine M with the lower talking conductor, thereby giving the operator a busy signal.

The short circuit which was thus established about the lower winding of relay 42 causes said relay, whose windings are differential, to be energized, thereby switching the locking circuit of the busy relay 85 to the wiper 73, this new circuit extends from ground at wiper 73, springs 98 and 90, springs 91 and 96, springs 99 and 87, springs 65, and relay 85 to battery. It will be seen therefore, that the relay 85 instead of being permanently locked, remains energized only as long as the called line is in use and until the ground is removed from the private contact thereof.

As soon therefore as the ground disappears from the private wiper 73, the relay 85 will deenergize and restore its springs to normal. The shunt being removed from the winding of relay 42 by the opening of springs 97, said relay will deenergize after a brief interval and close one point in the circuit of relay 88. The circuit for relay 88 is now complete and extends from ground through springs 47, 122 and 121, springs 89 and 90, springs 91 and 92, lower winding of relay 88, springs 90′ and 86, private wiper 73, relay 94 of line switch C, and magnet 95 to battery. Relays 88 and 94 energize over this circuit, relay 94 being mechanically adjusted so as to attract its armatures only half way when the line relay 100 is not energized, will therefore operate to disconnect the relay 100 and ground from the called line. Relay 88, upon energizing, closes a locking circuit for its upper winding through springs 101, opens the circuit of relay 85 at springs 65, and places a direct ground on the wiper 73 to maintain the called line busy and also to short circuit its own lower winding. Another result of the energization of relay 88 is the closure of the springs 102 and 103, thereby connecting ringing current to the called line. The ringing circuit extends from battery through the upper winding of relay 48, springs 104 and 105, springs 102, wiper 71, to and through the ringer of substation A, and back through wiper 72, springs 103, springs 106 and 107, to spring 108. The spring 108 is controlled by the common interrupter relay 109 to connect the above traced ringing circuit alternately to the battery B and to the generator R.

As long as the receiver of the called station remains on the hook, the ringer thereat will be operated alternately and the relay 48 will remain deenergized, being nonresponsive to alternating current. When the receiver is removed in response to the signal, a direct current circuit will be established for said relay 48 which will immediately energize to disconnect the ringing lead from spring 108 from the circuit of the called line by opening the springs 107 and 106 and to connect the talking circuit from the condensers 110 and 111 to the wipers 71 and 72. The energization of relay 48 connects the ground from springs 112 through springs 113 to close a locking circuit for its own lower winding and also connects said ground to lower winding of back bridge relay 114. The springs 105 and 106, upon engaging their front contacts, close a circuit for the back bridge relay 114 extending from ground at relay 52, through springs 112, spring 113, lower winding of relay 114, front contact of spring 106, springs 103, wiper 72, through the talking equipment of substation A, and back through wiper 71, springs 102, spring 105 and its front contact, and upper winding of relay 114 to battery. The relay 114 energizes over this circuit and operates the springs 115 and 116 and the associated contacts to reverse the connections of line relay 41 to the talking circuit, and to short circuit the windings of relay 42. This causes a reversal of current in the talking circuit to the lower winding of the back bridge relay 12 of the selector E. The relay 12 now having both windings assisting each other operates to close the circuit of relay 120 at springs 121. The relay 120, upon energizing, opens the circuit of relay 122 at springs 123, closes a new circuit for the lower winding of relay 12 at springs 124, and replaces the relay 6 directly in the operating circuit of the operator in place of relay 5 which now deenergizes. The closure of springs 125 at this time close the circuit for a supervisory relay in the operator's cord circuit to control the usual operator's signal in order to notify the operator that the called man has answered and also short circuits the relay 122. The springs 117 by the relay 114 (Fig. 2) are also closed to maintain the connector relay 88 energized in case the operator should disconnect the calling plug P from the jack X before the called party has hung up, and thereby maintaining the connector in operated position, also the springs 118 are opened to maintain the circuit of release magnet 119 open until the called man hangs up.

Conversation may now proceed over the heavy conductors shown in the drawings and when the conversation is completed, the connector may be released by either the operator or called man, that is, by the last party to restore his receiver, while the selector E is restored by the operator only. Should the calling subscriber hang up first, the operator will then remove the plug from the jack X and thereby open the circuit of the relay 6 at the jack. The relay 6, upon deenergizing, closes an energizing circuit for the release magnet 27 and opens the holding circuits of relays 38 and 12. The selector E is thereupon released and in releasing opens the circuit of line relay 41 of connector H. The relay 41, upon deenergizing, opens the circuit of relay 52. The deenergization of those two relays prepares a circuit for the release magnet 119 which is held open at springs 118 of back bridge relay 114. Now, therefore, as soon as the called subscriber hangs up his receiver, the switch will be released in the usual manner by the deenergization of relay 114 and the subsequent operation of release magnet 119. Should the called subscriber have hung up his receiver first then the relay 114 would deenergize to close the springs 118 and to again operate the supervisory signal in the operator's cord circuit by means of relays 12 and 120 of selector E, after which the operator would withdraw the plug to deenergize relay 41 and release the switches in the usual manner.

When the operator is calling a subscriber in the manner pointed out, it is often necessary for the operator to re-ring the called subscriber either because the called subscriber hangs up too soon or because the operator has another call waiting for the same subscriber. In this case, the operator will actuate the ringing key K′ to connect generator out over cord circuit and through the windings of a specially tuned relay 122′ (Fig. 1). The relay 122′ will not be short circuited by the springs 125 at this time, as relay 120 will be deenergized when the called subscriber hangs up. The relay 122′, upon energizing, closes the springs 126 to short circuit one winding of the relays 42 and 41 (Fig. 2). This short circuit extends from ground through springs 126, winding 40 of the repeating coil, springs 15, wiper 23, lower winding of relay 42, springs 45 and 46, and lower winding of relay 41 to ground. The relay 42 being differential will energize at this time to open the springs 112, which springs control the ground connection to ring cut-off relay 48 as before pointed out. The relay 48 will therefore deenergize to again close the previously traced ringing circuit for the called station, after which, the relays are operated in the usual manner when the call is answered to disconnect the ringing circuit and again converse over the talking circuit shown.

It will be seen therefore that I have provided a very useful and efficient method by which the called subscriber may be re-rung or signaled by an operator, after the usual automatic ringing current has been disconnected and the called subscriber has again restored her receiver, and that this method is very simple and comprises only a means for again starting the automatic ring which may then be cut off by the response of the called man.

While, as stated, my invention is especially designed for those systems in which an operator is employed to establish certain connections by means of automatic switches, it is not necessarily limited to such systems, but includes features which may be of utility in full automatic systems or in manual systems. I do not, therefore, wish to be limited to the particular embodiment of my invention shown and described herein, but desire to include and have protected by Letters Patent all forms of my invention which come fairly within the scope of the appended claims:

What I claim as my invention is:

1. In a telephone system, a called line, means for establishing a connection with said called line, a source of signaling current, means for automatically connecting said source of current to the called line, means for interrupting said current to intermittently operate a signal thereat, means for disconnecting said current, means for again applying said ringing current to the called line to operate the signal before said connection is released, a source of alternating current, and means for applying said alternating current to said connection to actuate said last means.

2. In a telephone system, a called line, means for establishing a connection with said called line and means controlled by the called subscriber for releasing said connection, a source of signaling current, means for automatically connecting said source of current to the called line to operate a signal thereat and for disconnecting said current, and manual means for again applying said ringing current to the called line to operate the signal before said connection is released.

3. In a telephone system, an automatic switch for establishing a connection to a called line and for automatically applying signalling current thereto, means controlled by the called subscriber for releasing said connection, means in said switch for disconnecting said signaling current from the called line, and means for again causing said current to be applied to said line to signal the subscriber on said line a second time.

4. In a telephone system, an automatic switch for establishing a connection with a called line and for applying signaling current thereto to signal a subscriber on said line, means for automatically disconnecting said current when the subscriber responds to said signal, means controlled by the called subscriber for releasing the connection, and means for again applying said current to the called line without operating said releasing means after said current has been disconnected by the called subscriber.

5. In a telephone system, a pair of subscribers' lines, means for establishing a connection between said lines, and for automatically applying signaling current to the called one of said lines to signal the subscriber thereon, means controlled by the called subscriber for disconnecting said current from his line and for releasing said connection, means for preventing the called subscriber from releasing said connection, and means for again applying signaling current to the called line when the called subscriber hangs up first and before the connection has been released.

6. In a telephone system, a called line, means for establishing a connection with said line and for automatically applying signaling current thereto, a relay, an energizing circuit for said relay including said called line, means controlled by the called subscriber for closing said energizing circuit to operate said relay to disconnect said signaling current, a circuit for locking said relay energized independent of the called subscriber's control, and means for opening said locking circuit to permit said current to again be applied to said line.

7. In a telephone system, means for establishing a connection with a called line and for applying signaling current thereto, a relay for disconnecting said current from the called line, a circuit for locking said relay energized, a differential relay having contacts in series with said locking circuit, means for energizing said differential relay to open said locking circuit and again apply signaling current to said line.

8. In a telephone system, means for establishing a connection with a called line and for applying signaling current thereto, a relay for disconnecting said current from the called line, a circuit for locking said relay energized, a differential relay for controlling said locking circuit, a tuned relay for controlling said differential relay, and means for energizing said tuned relay to energize said differential relay to in turn open said locking circuit to cause said signaling current to be again applied to said line.

9. In a telephone system, means for establishing a connection with a called line and for applying signaling current thereto, a relay for disconnecting said current from the called line, a circuit for locking said relay energized, a differential relay having contacts in series with said locking circuit, means for energizing said differential relay to open said locking circuit and again apply signaling current to said line before the established connection for said called line is released.

10. In a telephone system, means for establishing a connection with a called line and for applying signaling current thereto, a relay for disconnecting said current from the called line, a circuit for locking said relay energized, a differential relay for controlling said locking circuit, a tuned relay for controlling said differential relay, and means for energizing said tuned relay to energize said differential relay to in turn open said locking circuit to cause said signaling current to be again applied to said line before the established connection with said called line is released.

11. In a telephone system, an operator's position, a subscriber's line, means controlled by the operator for establishing a connection with said line and for automatically applying ringing current thereto, a relay for automatically disconnecting said ringing current from the called line, a circuit for locking said relay energized, a differential relay for controlling said locking circuit, a tuned relay for controlling said differential relay, and means controlled by the operator for supplying alternating current to said tuned relay to energize the same, to thereby energize said differential relay to open said locking circuit and cause ringing current to again be applied to the subscriber's line.

12. In a telephone system, an operator's position, a subscriber's line, means controlled by the operator for establishing a connection with said line and for automatically applying ringing current thereto, a relay for automatically disconnecting said ringing current from the called line, a circuit for locking said relay energized, a differential relay for controlling said locking circuit, a tuned relay for controlling said differential relay, and means controlled by the operator for supplying alternating current to said tuned relay to energize the same, to thereby energize said differential relay to open said locking circuit and cause ringing current to again be applied to the subscriber's line before the connection to the subscriber's line is released.

13. In a telephone system, an operator's position, a subscriber's line, means controlled by the operator for establishing a connection with said line and for automatically applying ringing current thereto, a relay for automatically disconnecting said ringing current from the called line, a circuit for locking said relay energized, a double wound relay for controlling said locking circuit, a relay for controlling said double wound relay, and means controlled by the operator for energizing said last mentioned relay to energize said double wound relay by short circuiting one of its windings whereby the locking circuit of said first relay is opened and ringing current is again applied to the subscriber's line.

14. In a telephone system, a called line, means for establishing a connection with said line, two sources of alternating current, a relay, means for automatically connecting one of said sources of current to said called line to operate a signal thereat, means for disconnecting said current, and means for applying said second source of current to said relay to again apply said first mentioned ringing current to said called line.

15. In a telephone system, an operator's position, a called line, means for establishing a connection with said line, two sources of alternating current, a relay, means for automatically connecting one of said sources of current to said called line to operate a signal thereat, means for disconnecting said current, and means under the control of the operator for applying said second source of current to said relay to again apply said first mentioned ringing current to said called line.

16. In a telephone system, a telephone line, means for establishing a connection with said line, a source of signalling current, means for automatically connecting said source of current to said line to operate a signal thereat, means for disconnecting said source upon the response of the subscriber on said line, a source of alternating current, and means for applying said alternating current to said connection to again actuate said means for connecting said source of signalling current to said line.

17. In a telephone system, a telephone line, an automatic switch for establishing connection with said line, a source of signalling current, means in said switch for automatically connecting said source of current to said line, means actuated by the response of the subscriber on the said line for disconnecting said source of ringing current, a source of alternating current, and means for connecting said alternating current to said connection to actuate automatic means for again connecting said source of ringing current to said line.

18. In a telephone system, an operator's position, an automatic switch, telephone lines accessible to said switch, means controlled by the operator at said position for operating said switch into connection with one of said lines, a source of ringing current, means in said switch for connecting said source of ringing current to said line, automatic means operated upon the response of the subscriber on the connected line for disconnecting said ringing current, a source of alternating current, and means for connecting said source of alternating current to said connection to cause said source of ringing current to be again connected to the connected telephone line.

19. In a telephone system, an operator's position, an automatic switch, telephone lines accessible to said switch, means controlled by the operator at said position for operating said switch into connection with one of said lines, a source of ringing current, means in said switch for connecting said source of ringing current to said line, automatic means in said switch operated upon the response of the subscriber on the connected line for disconnecting said ringing current, a source of alternating current and a key at said operator's position for connecting said source of alternating current to said connection to cause said source of ringing current to be again connected to the said connected line.

20. In a telephone system, a called line, means for establishing a connection with said line, a source of signalling current, means for automatically connecting said source of current to said called line to operate a signal thereat, means for disconnecting said current, a source of alternating current, and means for connecting said source of alternating current to said connection to again apply said ringing current to said line.

21. In a telephone system, a called line, means for establishing a connection with said line, a source of signalling current, a relay, means for automatically connecting said source of current to said called line to operate a signal thereat, means for disconnecting said current, a source of alternating current, and means for applying said source of alternating current to said relay to again apply said signalling current to said called line.

22. In a telephone system, a connector switch and associated telephone lines, a selector for connection with said connector, means for automatically causing the connector to project signaling current over a called one of said lines, means to operatively disconnect said signaling current upon response from the called line, and means for thereafter re-connecting current to the called line at will without destroying the established connection, said last means including a relay in the selector in bridge of the talking conductors thereof.

23. In a telephone system, a connector and associated telephone lines, a selector for connection with said connector, means for operating said selector and said connector for extending connection to a called line, means for automatically causing the connector to project signaling current over a called one of said lines, means to operatively disconnect said signaling current upon a response from the called line, means to continue a pair of talking conductors leading in to the selector to the called line by way of the connector, and means for thereafter re-connecting signaling current to the called line at will, said last means including a relay in bridge of the said pair of talking conductors, and which relay includes a condenser in series with the winding thereof.

24. In a telephone trunking system, a calling trunk link and co-operating links completing a connection to a connected called line, a signaling current source applied to the called line, means controlled from the called line for disconnecting the signaling current applied thereto, and means controlled thereafter from the calling trunk including a bridge of the talking conductors thereof and having a condenser in series therewith to again connect the said signaling current source to the called line.

25. In a telephone system, a trunk line, a connector switch, two relays in said connector connected to said trunk line, means for controlling the first of said relays over the trunk line independent of the second relay to operate the connector to connect the trunk line with a called line, means for automatically signaling the called subscriber, means for stopping the signaling operation when the called party responds, means for controlling said second relay over the trunk line independent of the said first relay, and circuit arrangements whereby said second relay causes said last means to restart the signaling operation after the called party has hung up.

26. In a telephone system, means including a final connector switch for extending a connection to a called line, a line relay in the connector for controlling the operation thereof, means in the connector for automatically signaling the called subscriber, means in the connector for stopping the signaling operation when the called subscriber responds, and a second relay in the connector in series with said line relay for controlling said last means to restart the signaling operation after the called subscriber has hung up.

27. In an automatic connector switch, a ringing relay, a ring cut off relay, a line relay, and a relay in series with said line relay for controlling said ring cut off relay.

28. In an automatic connector switch, a ringing relay, a ring cut off relay, a locking circuit for said ring cut off relay, a line relay, and a relay in series with said line relay controlling said locking circuit.

29. In an automatic connector switch, a ringing relay, a ring cut off relay, a locking circuit for said ring cut off relay, and a differential relay controlling said locking circuit.

30. In a telephone system, means including a selector and a connector for establishing a connection between a calling and a called line, a control circuit extending from said selector to said connector for maintaining the connection, a ring cut off relay in the connector energized when the subscriber of the called line answers, means in the selector for establishing a second circuit extending to the connector while the first circuit is maintained, and means in the connector controlled over said second circuit for deenergizing said ring cut off relay to rering the called party.

31. In a telephone system, means including a selector and a connector for establishing a connection between a calling and a called line, a control circuit extending from said selector to said connector for maintaining the connection, a ring cut off relay in the connector energized when the subscriber of the called line answers, means in the selector for establishing a second circuit extending to the connector while the first circuit is maintained, said second circuit including a conductor extending between said switches which is included also in said first circuit, and means in the connector controlled over said second circuit for deenergizing said ring cut off relay to rering the called party.

32. In a telephone system, means including a selector and a connector for establishing a connection between a calling and a called line, means in the connector for automatically intermittently signaling the called party until a response is secured, means for restarting the signaling operation after the called party hangs up and while the connection is maintained, a relay in the selector controlled over the talking conductors leading to said selector, and circuit arrangements through the medium of which said relay controls said restarting means.

33. In a telephone system, means including a selector and a connector for establishing a connection between a calling and a called line, means in the connector for automatically intermittently signalling the called party until a response is secured, means for reringing the called party after he hangs up while maintaining the connection, a relay in the selector controlled over a talking conductor leading to said selector, and circuit arrangements by means of which said relay controls said reringing means.

34. In a telephone system, means including a selector and a connector for establishing connection between a calling and a called line, a ring cut off relay in the connector, a relay in the selector controlled by the calling party over the talking conductors leading to said selector, and means whereby said last mentioned relay controls said ring cut off relay.

35. In a telephone system, means including a selector and a connector for establishing connection between a calling and a called line, a ring cut off relay in the connector, a relay in the selector controlled by the calling party over a talking conductor leading to said selector, a relay in the connector controlled by said second relay over a talking conductor leading to said connector, and means whereby said third relay controls said ring cut off relay.

36. In a telephone system, a connector for connecting with a called line, a selector for extending a calling line to said connector, automatic signaling equipment associated with said connector for signaling the called party independent of continued control by the calling party, a relay in said selector controlled by the calling party over a talking conductor leading to said selector, and means controlled by said relay for starting the operation of said signaling equipment.

37. In a telephone system, a connector for connecting with a called line, means including an operator's plug and jack and a selector for extending a connection to said connector, automatic signaling equipment associated with said connector independently operable after its operation is initialed for intermittently signaling the called line, a relay in said selector controlled by the operator through contacts of said plug and jack, and means controlled by said relay for starting the operation of said signaling equipment.

38. In a telephone system, a connector for connecting with a called line, means including an operator's plug and jack and a selector for extending a connection to said connector, automatic signaling equipment associated with said connector independently operable after its operation is initialed for intermittently signaling the called line, a relay controlled by the operator through contacts of said plug and jack, and means controlled by said relay for starting the operation of said signaling equipment.

39. In a telephone system, a trunk circuit for connection with a called line, means including an operator's plug and jack and a second trunk circuit for extending a connection to said first trunk circuit, automatic signaling equipment associated with said first trunk circuit independently operable after its operation is initiated for intermittently signaling the called line, a relay in said second trunk circuit controlled by the operator through contacts of said plug and jack, and means controlled by said relay for starting the operation of said signaling equipment.

40. In a telephone system, a calling and a called line, a train of directive switches for linking a connection from the calling to the called line controlled from the calling line, a directive calling device on the calling line for operating the switches, means for applying signaling current to the called line, means to disconnect the said signaling current consequent to a response on the called line, and means controlled from the calling line through the operation of the said calling device from the calling line after the responded condition of the called line is effaced to reinitiate and automatically sustain the application of signaling current to the called line while maintaining the previously established connection.

41. In a telephone system, a calling and a called line, a train of directive switches for linking a connection from the calling to the called line controlled from the calling line, a directive calling device on the calling line for operating the switches, means for self-initiating the application of signaling current to the called line, means to disconnect the said signaling current consequent to a response on the called line, and means controlled from the calling line through the operation of the said calling device from the calling line after the responded condition of the called line is effaced to reinitiate and automatically sustain the application of signaling current to the called line while maintaining the previously established connection.

42. In a telephone system, a calling and a called line, a train of directive switches for linking a connection from the calling to the called line controlled from the calling line, a directive calling device on the calling line for operating the switches over an impulse conductor of the line, self-initiated means for applying sustained signaling current to the called line, means to disconnect the said signaling current consequent to a response on the called line, and means controlled from the calling line by the operation of the said calling device from the calling line after the responded condition of the called line has been effaced to reinitiate and sustain the application of signaling current to the called line while maintaining the previously established connection.

43. In a signaling system, a switch mechanism for companioning two non-companioned lines, a relay for connecting the companioned lines into talking relation, and means alternatively operable from either said line after the lines are companioned for effectively operating the relay without disconnecting the switch mechanism from the called line.

44. In a signaling system, a switch mechanism for companioning two non-companioned lines, a relay for connecting the companioned lines, and means alternatively operable from either said line after the lines are companioned for effectively operating the relay without disconnecting the switch mechanism from the called line.

45. In a telephone system having calling and called subscribers' lines, a toll operator's position having incoming toll lines and automatic switches controlled by either a calling subscriber or the toll operator for establishing a connection to a called line characterized by the fact that said switches are provided with restoring means normally controlled over a subscriber's line but controllable automatically through switches adjustable by the toll operator whereby the connection to a called line is maintained if the called subscriber hangs up his receiver or depresses the receiver hook in the case of a long-distance call.

46. In a telephone system having calling and called subscribers' lines, a toll operator's position having incoming toll lines and automatic switches controlled by either a calling subscriber or the toll operator for establishing a connection to a called line characterized by the fact that said switches are provided with restoring means controlled by the toll operator in the case of a long-distance call and that the toll operator's position is provided with means for automatically ringing a called subscriber who hangs up prematurely.

47. In a telephone exchange system, a combined toll and local connector for use by an operator or by local subscribers in selecting and connecting with called lines; an impulse-sending device associated with the toll lines controlled by the operator and adapted to send out numerical and controlling impulses; means for repeating said controlling impulses; automatic ringing means associated with said connector; and means operated by the repeated controlling impulses for bringing said automatic ringing means again into action.

Signed by me at Chicago, Illinois, this 21st day of January, 1924.

JOHN WICKS.